United States Patent [19]
Jackson

[11] 3,965,013
[45] June 22, 1976

[54] GRAVITY CLARIFIER

[76] Inventor: George F. Jackson, 5745 E. 47th Place, Tulsa, Okla. 74135

[22] Filed: Oct. 31, 1974

[21] Appl. No.: 519,526

[52] U.S. Cl. .............................. 210/519; 210/534
[51] Int. Cl.² ........................................ B01D 21/26
[58] Field of Search .......... 210/519, 521, 522, 534, 210/294, 320, 304, 533, 532 R

[56] References Cited
UNITED STATES PATENTS

| | | | |
|---|---|---|---|
| 1,177,849 | 4/1916 | De Kalb | 210/519 X |
| 3,258,123 | 6/1966 | Fontaine | 210/519 X |
| 3,397,788 | 8/1968 | Duff et al. | 210/519 X |
| 3,622,009 | 11/1971 | Bordner | 210/532 R |
| 3,666,108 | 5/1972 | Veld | 210/522 X |
| 3,698,555 | 10/1972 | Conner | 210/304 X |

Primary Examiner—John Adee
Attorney, Agent, or Firm—Head, Johnson & Hafin

[57] ABSTRACT

A gravity clarifier for separating biological sludge from the water by gravity settling, which comprises a cylindrical tank having a closed bottom with a downwardly depending truncated conical shell attached at its large end to the upper portion of the tank wall, with a peripheral trough near the top end of the tank and a weir for the overflow of effluent liquid into the trough. The influent conduit enters the tank tangentially and flows the raw mixture into the tank in the space between the outside of the inverted conical shell and the tank wall. The sludge is removed from the tank bottom near the center of the tank.

6 Claims, 7 Drawing Figures

U.S. Patent   June 22, 1976   Sheet 1 of 2   3,965,013
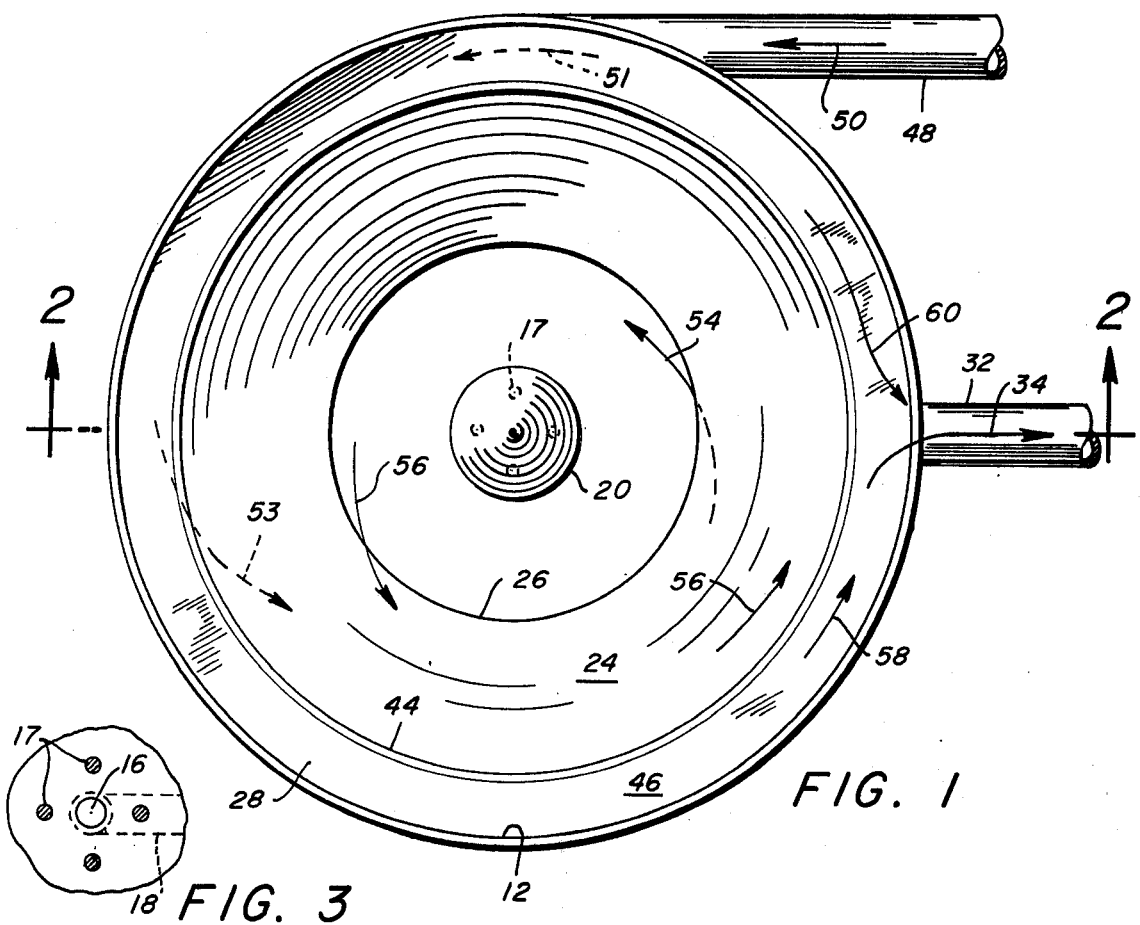
FIG. 1
FIG. 3
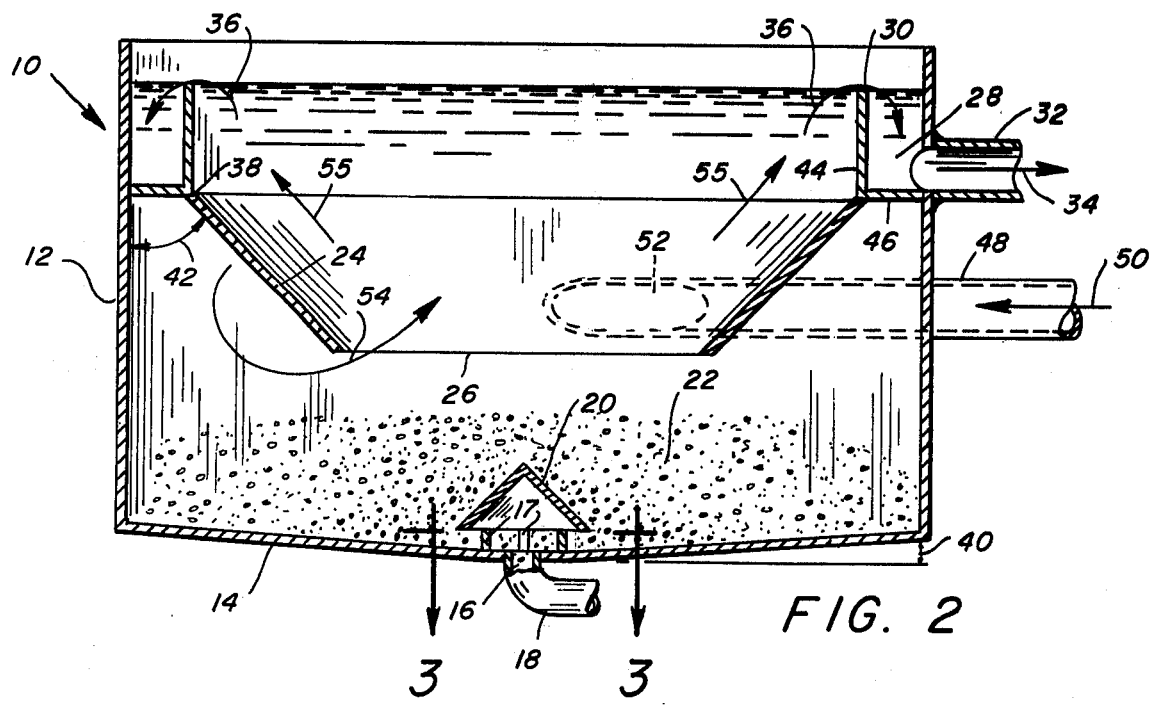
FIG. 2

GRAVITY CLARIFIER

BACKGROUND OF THE INVENTION

This invention lies in the field of gravity clarifiers for separating biological solids or sludge and other flocculent solid from water, by gravity settling. More particularly, it concerns a type of gravity clarifier in which the liquid flow patterns within the clarifier are derived from the energy of the influent liquid mixture, which flows tangentially into the circular tank. It further includes the feature of an inverted conical shell through which the outflowing liquid rises through the open bottom of the conical shell, with a constantly decreasing upward velocity, thus permitting the entrained solid matter to be released, and to agglomerate, and to fall as sludge to the bottom of the tank.

In the prior art various means have been devised for settling the solids out of a liquid mixture including the use of centrifugal force as in the hydrocyclones. The high velocity liquid flow in such systems however are damaging to the character of the floc normally present in the biological material, which comes in with the influent liquid. If the floc is fragile, a much lower velocity and more streamline flow of liquid mixture is required and conditions which promote flocculation are desirable, which are provided by the system of this invention.

SUMMARY OF THE INVENTION

It is a primary object of this invention to provide a gravity clarifier which provides the circular and helical motion of the liquid in the clarifier tank by the energy of the entering liquid mixture through the influent pipe. It is a further object of this invention to provide a gravity clarifier in which the sludge is moved in toward the center of the base of the tank, due to the induced flow of liquid in the tank resulting from the tangential flow of influent. It is a further object of this invention to provide a gravity clarifier in which the upward velocity of the flow of liquid toward the outlet provides a decreasing velocity of flow to the point where the velocity is low enough so that suspended solid matter can be released and by the force of gravity carried to the bottom. It is a still further object of this invention to provide a radial flow over a weir to an outlet trough for the effluent clarified liquid.

These and other objects are realized and the limitations of the prior art are overcome in this invention by providing the clarifier with a substantially cylindrical tank and substantially flat bottom. The influent liquid comes into the tank through a tangential pipe so that there is a slowly swirling motion to the liquid in the tank. There is an inverted truncated conical shell attached to the cylindrical wall of the tank and the entering liquid flows into the space between the conical shell and the tank wall. The initial flow of liquid must be in circular downward direction with a decreasing radius of flow so that it may enter the open bottom of the conical shell and, in a helical flow, rise to the surface where it flows over a peripheral weir into an outlet trough with suitable conduit means for the effluent liquid. The sludge is removed from the center of the tank bottom either by a suitable drain conduit or by means of an axial suction pipe the open end of which is close to the bottom of the tank. Suitable pump means and, if necessary, aspirating fluid means are provided to lift the sludge.

BRIEF DESCRIPTION OF THE DRAWINGS

These and other objects and advantages of this invention and a better understanding of the principles and details of the invention will be evident from the following description taken in conjunction with the appended drawing in which;

FIGS. 1 and 2 illustrate elevation and plan views of a preferred embodiment of this invention.

FIG. 3 shows a detail of the sludge outlet portion.

DESCRIPTION OF THE PREFERRED EMBODIMENTS

Figure 4:
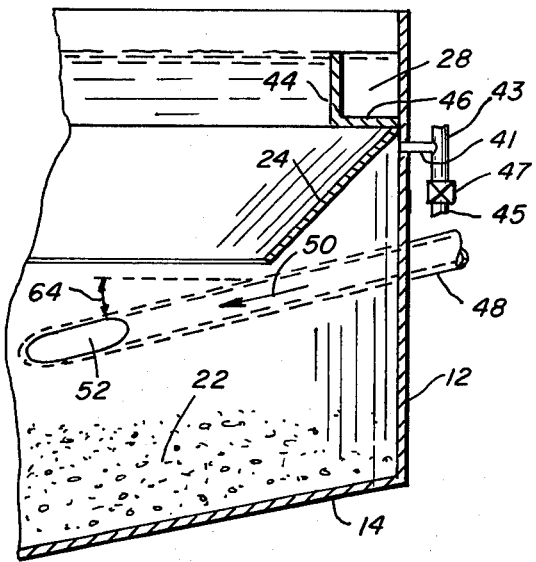
FIGS. 4, 5 and 6 show alternate variations of the embodiment of FIGS. 1 and 2.

Referring now to the drawings and in particular to FIGS. 1 and 2 there is shown in vertical cross-section and plan view one embodiment of this invention. The clarifier indicated generally by the numeral 10 comprises a cylindrical outer tank wall 12 with a substantially horizontal bottom 14. If desired the bottom 14 may be slightly sloping towards the center at an angle indicated by the numeral 40.

The sludge 22 will settle toward the bottom and can be drawn off by means of an opening 16 in the center of the bottom of the tank, and of outlet pipe 18 with suitable suction pumping means, as is well known in the art. A suitable shield 20 of conical shape may be provided. This shield is supported on a plurality of legs 17 and is provided as a vortex breaker to aid in drawing off the thicker sludge from near the bottom of the tank.

Figure 5:
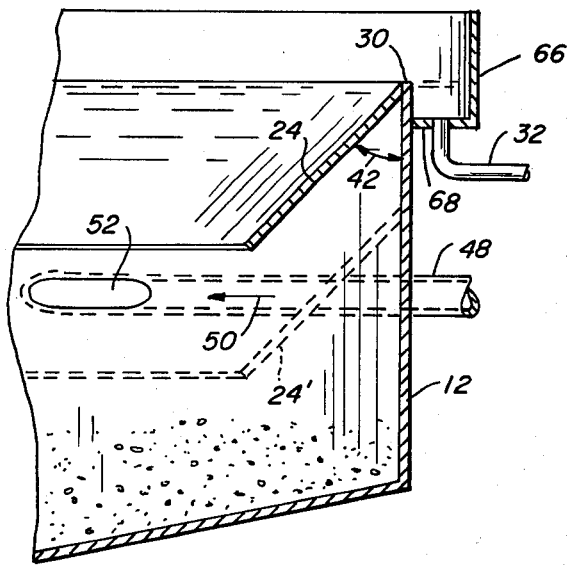
Figure 6:
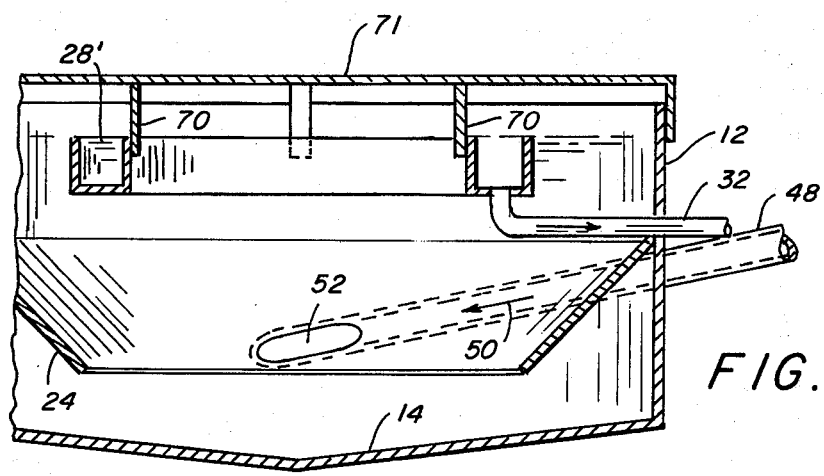

There is a downwardly depending truncated conical shell 24 which is attached at its upper larger diameter portion to the tank wall 12. This may be in conjunction with a trough 28, composed of a vertical cylindrical wall 44 and an annular bottom plate 46 attached to the outer wall 12 of the tank. As shown in FIGS. 4, 5 6, the conical shell can be attached directly to the tank wall 12.

The trough wall 44 and bottom 46 can be supported from the tank wall just above the top of the conical shell. The peripheral trough can also be mounted on the outside of the tank wall as in FIG. 5. The peripheral trough has a top edge 30, to the wall 44, which comprises a weir so that upwardly flowing liquid through the conical shell will flow over the edge 30 in accordance with arrows 36 into the trough 28, and out through the effluent conduit 32 in accordance with arrow 34.

The influent conduit 48 carries liquid in accordance with the arrow 50, which is to be clarified. As shown in the plan view of FIG. 1, this conduit 48 is attached tangentially to the tank wall and has an opening 52 through which the liquid enters in accordance with the arrow 51. While only one pipe 48 is shown, there may be a plurality of inlet pipes. The liquid flows circumferentially in accordance with the arrow 51 and partially inwardly and downwardly in accordance with arrow 53 and 54 until it is able to enter the open bottom 26 of the shell 24. After it comes into the shell the liquid flows in accordance with arrow 56 rising to flow over the weir 30 in accordance with arrow 36, and along the trough 28 in which it flows towards the outlet conduit 32 in accordance with arrows 58, 60, 34.

The inlet flow of liquid is at a relatively low velocity, which may be in the range of a few feet per second, or less, preferably of the order of one foot per second. It flows in a circular converging flow in accordance with arrows 53 and 54 so that the falling settling sludge becomes thicker as it is swept continuously toward and settles over the center of the tank. Thus the optimum point for delivery of the sludge is through a central opening 16 and pipe 18 as previously described.

As to the smaller particles, which because of their small mass are retained with the flowing liquid, the design of the expanding conical wall 24 to the rising liquid provides that the flow of liquid gradually decreases in velocity to the point where the stokes forces carrying the particles with the liquid become small enough that the gravity forces can permit the particles to drop within the rising liquid. Here they agglomerate, forming larger particles which have a better opportunity to drop through the rising liquid and thus to fall to the bottom as sludge.

In review, the construction is such that the entering liquid enters tangentially into the tank at a low enough velocity so that the structure of weak flocs is not broken up but is carried with the liquid. As the liquid slowly reduces velocity, the floc is permitted to slowly drop through the liquid producing a thicker sludge toward the bottom of the tank. The slowly rotating converging flow of the liquid sweeps this floc in toward the center and thus permits convenient withdrawal. Once the liquid enters the bottom of the central conical shell its velocity decreases as it rises, so as to permit a very quiet atmosphere in the liquid, and therefore permits the tiny particles of entrained material to slowly fall through the liquid and to be recovered. The clarified liquid rises vertically to slowly flow over the weir 30 into the outlet trough 38 and to the effluent conduit 32.

Referring now to FIGS. 4, 5 and 6, various modifications of the construction of the embodiment of FIGS. 1a and 2 are shown. In FIG. 4 the entrance conduit 48, while tangential with respect to the tank wall is indicated as downwardly depending by an angle 64, whereas in FIG. 2 it was shown as horizontal. While not shown, the angle of the inlet conduit 48 could equally well be in an upwardly direction at a corresponding angle, not shown.

Shown in FIG. 4 is an air vent 41, through the side wall 12 of the tank to vent air trapped in the angle between the walls 24 and 12. This vent connects to vent pipe 43, and to drain pipe 45 for drawing off floating material. Valve 47 can be periodically used for this purpose. This feature can be used in FIGS. 2, 4, 5, 6 and 7.

Also in FIG. 4 the conical shell 24 is shown connected directly at its top edge to the outer wall of the tank whereas in FIG. 2 it was connected to the inward bottom edge of the trough 28. A still further modification is shown in FIG. 5, where the junction of the conical shell and the tank wall by means of a horizontal annular plate 68 and short vertical cylindrical wall 65. The outflow is through the conduit 32.

In FIG. 5 the influent pipe is shown below the level of the conical shell 24. Shown in dashed lines is an alternate position for the conical shell, identified by numeral 24' which is lower in position, so that the entrance conduit 48 discharges liquid in the space between the conical wall 24' and the outer wall 12 of the tank.

The angle 42 between the wall of the shell 24 and the tank wall 12 can be varied as desired. It has been found that an angle in the range of 10°–80° between the tank wall and the conical shell is satisfactory, however an angle in the range of 30° to 60° provides optimum action by the slowing down of the velocity of the uprising water, to release the entrained particles.

In FIG. 6 is shown another embodiment in which the outlet trough 28' with its corresponding weir is of a lesser diameter than the tank wall. It is positioned by additional supports 70 from a cover to the tank 71, or other structural means that can be supported from the tank wall 12. The construction of FIG. 6 for the outlet trough provides the inner and outer edges of the trough fro the weir flow action.

Figure 7:
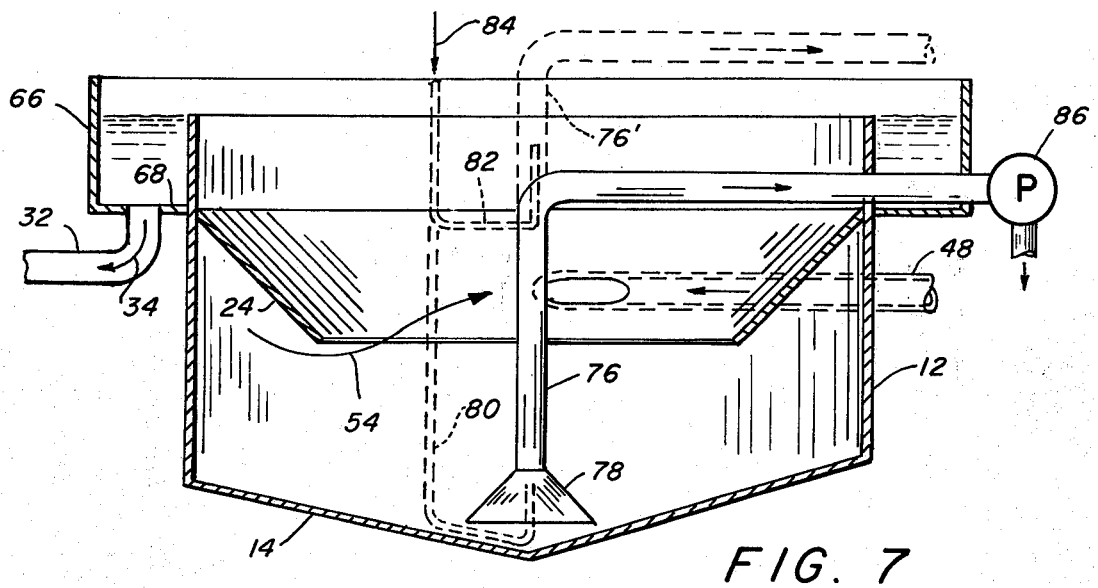
FIG. 7 illustrates a second means for removal of sludge from the clarifier tank.

In FIG. 7 is shown a variation of the structure of FIG. 5 in which a different method of removal of sludge is shown. Here again the sludge removal is from the axial portion of the tank. A suction pipe 76 with appropriate pump 86 draws up the sludge through a conical wall, 78 the purpose of which is to provide a funnel for entering material. The flow of sludge into the pipe 76 can be aided if desired by means of air lift pumping as it is understood in the art, and indicated by introducing air 84 through pipe 82. An alternative method of sludge removal would be through mechanical pump 86. The inflow of air 84 may be through a pipe 82 into the side of the vertical pipe 76' instead of at the bottom as shown. The tank construction and outlet trough are shown corresponding to that of FIG. 5.

A slight conical shape to the bottom 14 of the tank serves to aid the removal of the sludge through a bottom opening or through the axial pipe.

It has been determined that one reason for the high degree of solids separation is the mixing of the influent with the sludge to encourage flocculation of the very fine particles.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is clamed is:

1. A gravity clarifier for separating solids from liquid, comprising;

a large diameter circular cylindrical open top tank having a closed bottom;

a downwardly depending truncated conical shell attached at its large end to the tank wall;

an axial circular trough near the top end of said tank and a weir for the overflow of effluent liquid into said trough, the upper portion of the tank between said conical shell lower end and said overflow weir providing a quiescent gravity settling zone;

influent conduit means entering said tank tangentially below the large end of said truncated conical shell, the lower portion of the tank between the shell lower end and the tank bottom providing a swirling sludge bed directly beneath the quiescent settling zone; and means for the removal of the settled sludge from said tank bottom near the center of said tank bottom.

2. The clarifier as in claim 1 in which the top edge of said conical shell provides the overflow weir into said trough.

3. The clarifier as in claim 1 in which said trough is attached to said tank wall on the inside of said tank.

4. The clarifier as in claim 1 in which said trough is attached to said tank wall on the outside of said tank.

5. The clarifier as in claim 1 including vent means to vent air from the closed space between said inverted conical shell and said tank wall.

6. The clarifier as in claim 1 including means to withdraw liquid, including floating material, from the closed space between said inverted conical shell and said tank wall.

* * * * *